UNITED STATES PATENT OFFICE.

WILLIAM B. GROVER, OF PHILADELPHIA, PENNSYLVANIA, ASSIGNOR TO HIMSELF AND GEORGE C. HARRISON, OF SAME PLACE.

PAINT.

SPECIFICATION forming part of Letters Patent No. 469,634, dated February 23, 1892.

Application filed October 30, 1890. Serial No. 369,857. (No specimens.)

*To all whom it may concern:*

Be it known that I, WILLIAM B. GROVER, a citizen of the United States, and a resident of the city of Philadelphia, in the State of Pennsylvania, have invented a certain new and useful Improved Composition for Paint, of which the following is a full, clear, and exact description, reference being had to the accompanying drawings, forming a part of this specification.

My invention relates to the manufacture of paint, and has for its object the production of a paint which shall be fire and acid proof.

To that end it consists, primarily, in compounding a paint-body from refined bituminous-gas-coal tar, mixed with a non-combustible and acid-resisting mineral body in a pulverized state, as a basis for the composition, the other ingredients being added in the manner, form, and proportion as hereinafter set forth.

The design of my invention is to produce a paint composition which shall be adhesive to the surface to which it is applied and capable of withstanding a very high degree of heat and of resisting acid and other corrosive effects and in its freedom from the evaporation of constituent parts common with metallic and other paints. The base of the composition, as stated, is compounded from the unbroken residuum of gas-coal tar obtained by open distillation of the refuse of bituminous gas-coal, and if it is not to be had commercially in its purely-refined state (in which condition I have not been able to find it) I refine it as follows, viz: by a process of open distillation, in which the coal-tar is brought to a heat of about 212° to 220° Fahrenheit and is distilled until there is no sediment perceptible rising to the top surface, which process will take from one and a half to two and a quarter hours, depending upon the quality of the tar. The resultant product will be perfectly clear in appearance, and if well refined the process will extract from the coal-tar all the ammonia, creosote, and all other acids, together with the lighter oils— such as benzine, benzole, &c.—usually contained in such gas-tar, while all the dead oils will be given off or evaporated during the process. In the manufacture of the base I use pulverized mica or fossil-meal, refined plumbago, and isinglass. These several substances are cumulative of each other and are therefore to be added together to constitute the requisite quantity, or may be substituted for each other with results as hereinafter mentioned. In the mixing of these into the composition no solution takes place; but the same are mixed into the refined coal-tar while it is hot, for which purpose the proportions will be as follows: To one gallon of the refined coal-tar will be added four ounces of fossil-meal and four ounces of bolted mica or isinglass, or for either four ounces of refined pulverized plumbago may be substituted in whole or in part. As a drier, I prefer to use six ounces of manganese. The coloring-matters used are mineral colors only and the proportion varies according to the color, as is usual with all paint compositions.

This paint, if found too thick when used, is to be reduced, preferably, by turpentine. I have found that the pulverized plumbago or soapstone mentioned as a substitute for or addition to bolted mica or fossil-meal should not be wholly substituted therefor, as it does not produce as good a result in the resistance of heat. As a drier, six ounces of manganese are to be added; but some other drier may be substituted therefor, in whole or in part, such as litharge. The proportions stated of the several ingredients may be varied without substantially varying the resultant composition produced.

Having thus described my invention, I claim as new and desire to secure by Letters Patent—

1. A paint body or composition having for a base the distilled unbroken residuum of bituminous-gas-coal tar mixed with a pulverized non-combustible and acid-resisting mineral, the said ingredients being compounded in the manner and in or about the proportions substantially as set forth.

2. A paint body or composition consisting of the distilled unbroken residuum of bituminous-gas-coal tar mixed with fossil-meal, bolted mica, refined pulverized plumbago, and soapstone, a drier, such as manganese or litharge, and a mineral coloring-matter, the same being compounded in the manner and in or about the proportions set forth.

In testimony whereof I have hereunto affixed my signature this 30th day of September, A. D. 1890.

WILLIAM B. GROVER.

Witnesses:
H. T. FENTON,
JAS. WATSON.